United States Patent
Kumar et al.

(10) Patent No.: US 11,150,940 B2
(45) Date of Patent: Oct. 19, 2021

(54) SYSTEM AND METHOD FOR RECORDING TRANSACTION ASSOCIATED WITH A PAGE-ORIENTED NON-VOLATILE MEMORY

(71) Applicant: IDEMIA, Noida (IN)

(72) Inventors: Mrityunjay Kumar, Bihar (IN); Mohammad Ovais Siddiqui, Hyderabad (IN)

(73) Assignee: IDEMIA, Noida (IN)

( * ) Notice: Subject to any disclaimer, the term of this patent is extended or adjusted under 35 U.S.C. 154(b) by 0 days.

(21) Appl. No.: 16/274,853

(22) Filed: Feb. 13, 2019

(65) Prior Publication Data
US 2019/0250945 A1    Aug. 15, 2019

(30) Foreign Application Priority Data
Feb. 15, 2018   (IN) .............................. 201811005799

(51) Int. Cl.
| | |
|---|---|
| *G06F 12/00* | (2006.01) |
| *G06F 9/46* | (2006.01) |
| *G06F 12/1009* | (2016.01) |
| *G06F 12/02* | (2006.01) |
| *G06F 9/54* | (2006.01) |
| *G06F 9/4401* | (2018.01) |

(52) U.S. Cl.
CPC ............ *G06F 9/467* (2013.01); *G06F 9/4401* (2013.01); *G06F 9/544* (2013.01); *G06F 12/0246* (2013.01); *G06F 12/1009* (2013.01)

(58) Field of Classification Search
CPC ... G06F 9/46; G06F 9/54; G06F 9/467; G06F 9/4401; G06F 9/544; G06F 9/466; G06F 12/02; G06F 12/0246; G06F 12/1009
USPC ........................................................ 711/154
See application file for complete search history.

(56) References Cited

U.S. PATENT DOCUMENTS

| | | | |
|---|---|---|---|
| 2007/0005664 A1* | 1/2007 | Kodavalla | G06F 16/2365 |
| 2008/0263305 A1* | 10/2008 | Shu | G06F 3/0659 711/170 |
| 2010/0332891 A1* | 12/2010 | Brune | G06F 11/141 714/5.11 |
| 2017/0199818 A1* | 7/2017 | Lomet | G06F 12/1009 |

* cited by examiner

*Primary Examiner* — Shawn X Gu
(74) *Attorney, Agent, or Firm* — Nath, Goldberg & Meyer; Jerald L. Meyer

(57) ABSTRACT

A transaction recording method associated with a page-oriented non-volatile memory is disclosed. The method includes identifying page requiring one or more update for implementing a defined transaction. Further, the method includes replicating the page in a non-volatile buffer. The method further includes updating the identified page with the transaction contents. The transaction is committed if the page is updated without interruption else the entire transaction is rolled-back.

15 Claims, 3 Drawing Sheets

SYSTEM AND METHOD FOR RECORDING TRANSACTION ASSOCIATED WITH A PAGE-ORIENTED NON-VOLATILE MEMORY

FIELD OF THE INVENTION

The present invention relates to recording transactions and providing anti tearing support associated with a page oriented non-volatile memory.

BACKGROUND

Many a times, due to unforeseen situations power supply to devices having non-volatile memories, is interrupted which leads to tearing. The tearing relates to abrupt disruption of transactions performed or implemented through a non-volatile memory in a device. Further, due to user operations, transaction may be aborted suddenly which also relates to the tearing. Due to tearing, state of the non-volatile memory becomes inconsistent which results in data crash or incorrect data reading by the non-volatile memory. For instance, a power supply to a smart card having a non-volatile memory, may be interrupted due to situations such as terminal power down or abrupt removal of card, thereby leading to tearing on the smart card. Due to tearing, state of the non-volatile memory of the card becomes inconsistent which is undesirable.

To avoid such situations, anti-tearing is implemented which ensures re-storing of data at next power reset or powering up of the device having the non-volatile memory. In order to implement the anti-tearing, transactions associated with the non-volatile memory are recorded by performing backup of data repeatedly during implementation of transactions on the non-volatile memory. Many a times, same data is backed up again and again if an update request comes for the same data. Furthermore, a complete page having the data to be updated, is backed up repeatedly even if an update request is received for updating a single byte of data on the page. With every byte update, the complete page is backed up in a buffer which leads to increase in shortage of free storage area on the non-volatile memory, further leading to increased execution time of the memory operations. The backing up of the complete page with every byte update leads to exponentially increased number of page backups which hampers the performance of the device utilizing the non-volatile memory and reduces its endurance.

Therefore, there is a need to alleviate drawbacks of conventional transaction recording method associated with page-oriented non-volatile memories.

SUMMARY

The present invention address the aforementioned drawbacks in the state of the art and in one aspect of the present invention, there is provided a transaction recording method associated with a page-oriented non-volatile memory. The method includes steps of identifying one or more pages requiring one or more updations for implementing a defined transaction. The method further includes replicating the one or more pages in a non-volatile buffer and updating the identified one or more pages with the transaction (new) contents. The replicated one or more pages are restored if the transaction is interrupted or else the replicated one or more pages are discarded.

In accordance with another aspect of the present invention, there is provided a device for recording transaction associated with a page-oriented non-volatile memory. The device includes one or more processing unit(s) to identify one or more pages requiring one or more updations for implementing a defined transaction. The one or more processing unit(s) replicate the one or more pages in a non-volatile buffer and update the identified one or more pages, with the transaction (new) contents. The replicated one or more pages are restored if the transaction is interrupted or else the replicated one or more pages are discarded.

DETAILED DESCRIPTION

Figure 1:
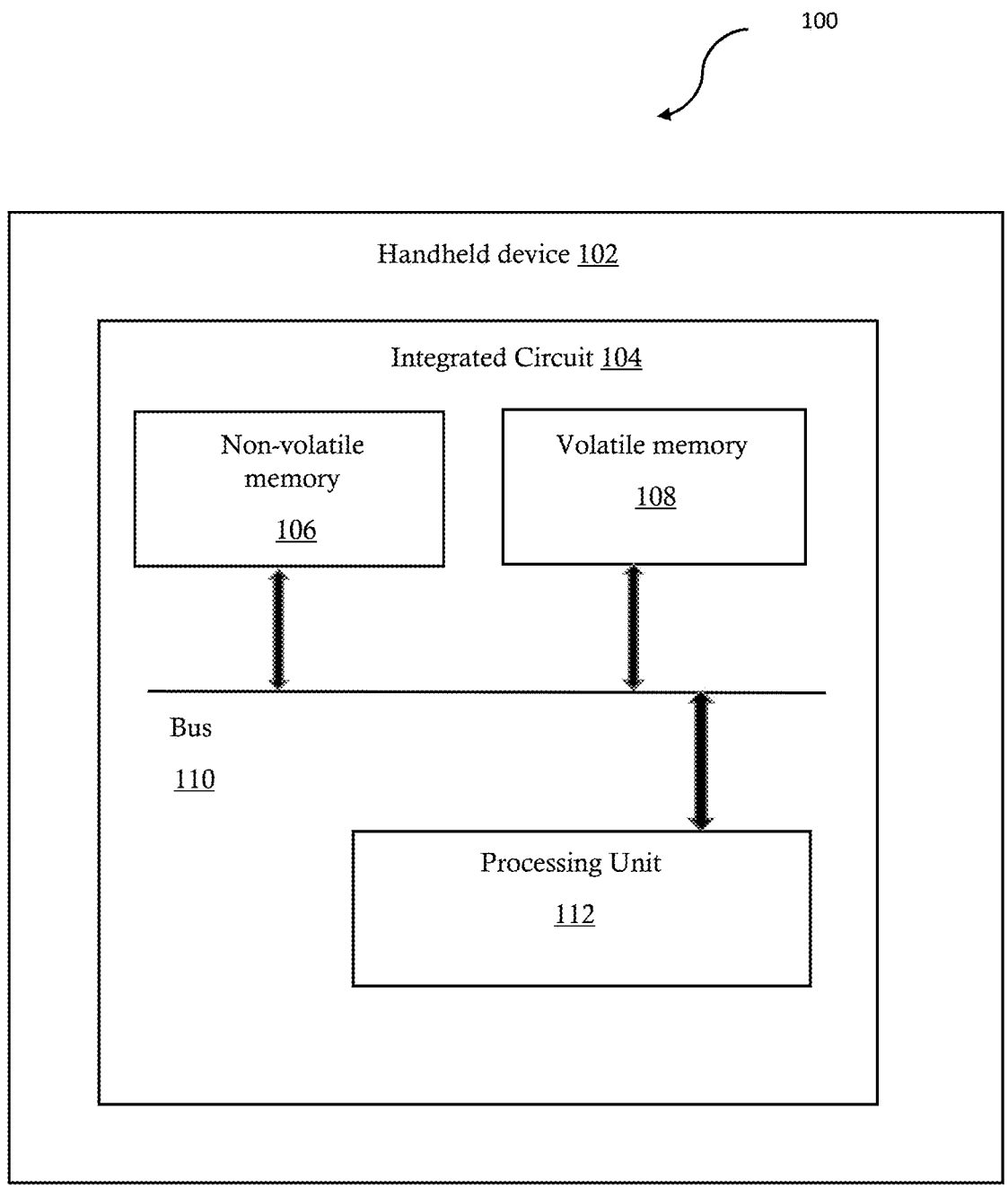
FIG. 1 illustrates a device comprising a non-volatile memory, in accordance with an embodiment of the present disclosure.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment (s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

The device and the method of the present invention facilitates reduced consumption of memory area to implement recording of transactions associated with the page oriented non-volatile memory. The present invention further reduces the need of multiple back up of pages in a non-volatile buffer of the memory. Furthermore, the method and device of the present invention substantially reduces the execution time of transactions associated with the non-volatile memory due to reduced number of back up of pages in the non-volatile buffer.

Figure 2:
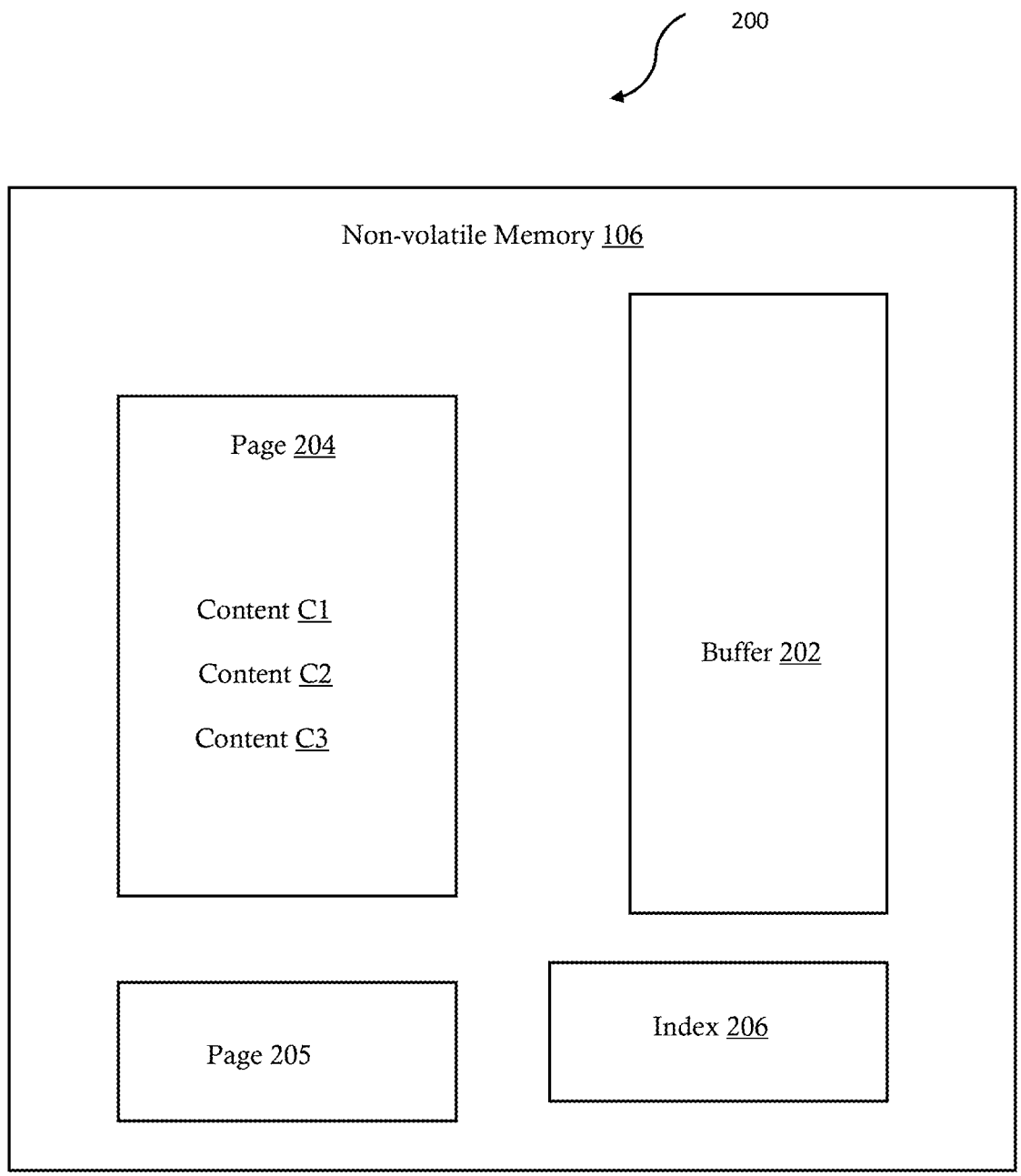
FIG. 2 illustrates the non-volatile memory of the device of FIG. 1, in accordance with an embodiment of the present disclosure.
Figure 3:
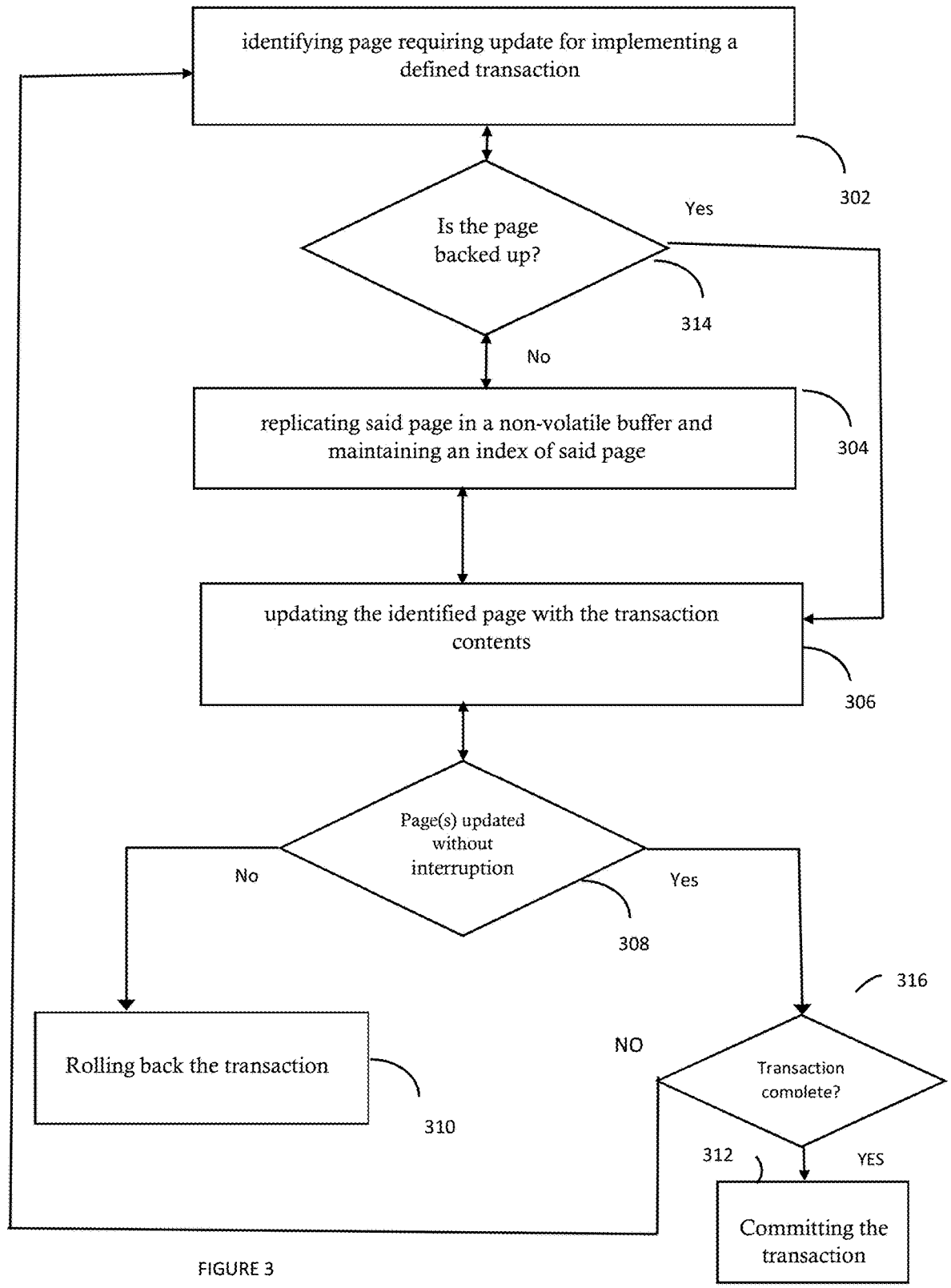
FIG. 3 illustrates a flow diagram depicting a transaction recording method in accordance with an embodiment of the present disclosure.

Referring to FIGS. 1-3, a system (100) includes a handheld device (102) which comprises an integrated circuit (104). The integrated circuit (104) may be mounted on or embedded in the handheld device (102) which can be a portable handheld device such as a smart card. The integrated circuit (104) may include interface communication means for enabling data reading and writing in a memory area of the integrated circuit (104). The integrated circuit (104) may include a non-volatile memory (106) and a volatile memory (108), wherein both the memories may be accessed by a bus (110). The integrated circuit (104) further includes a processing unit (112) which access the non-volatile memory (106) and the volatile memory (108) through the bus (110) to manage both the memories. In an embodiment, the non-volatile memory 106 is a page oriented non-volatile memory, such as a flash memory.

As depicted in FIG. 2, the non-volatile memory 106 includes a non-volatile buffer (202) which may be utilized to store a copy of a page 204 at the time of replicating the page 204 during recording of transactions associated with the non-volatile memory 106. The page 204 may include transaction contents (C1, C2, and C3).

The method of recording the transactions includes a step of identifying (302) a page requiring one or more update for implementing a defined transaction. In an embodiment, the defined transaction may include an atomic transaction.

Further, the method includes a step of replicating (304) the page (204) in the non-volatile buffer (202) by storing a copy of the page (204) in the non-volatile buffer (202). The step of replicating (304) is performed in an event a step of determining (314) is performed to determine that the page is not already being backed up. At the step of replicating (304), an index (206) of the page is further stored in the non-volatile memory (106). In an embodiment, the index (206) may include an address of the page (204). In another embodiment, the index (206) may further include validity information along with the address of the page (204). In an embodiment, the validity information may include an active state and an inactive state. In an exemplary embodiment, the active state may be represented by "1" and the inactive state may be represented by "0". The representation of the active state and the inactive state is not limited to "0" and "1", and any other suitable representation may be used to represent the active and the inactive state. The active state corresponds to a state of operation being performed on the page (204). The inactive state corresponds to a state of operation not being performed on the page (204). In an exemplary embodiment, the index (206) of the page (204) and a page (205) may be stored in the non-volatile memory (106). The index (206) may include the validity information of the pages (204) and (205). In one embodiment, the validity information of the page (204) may include an active state and may include an inactive state for the page (205). In another embodiment, the validity information of the page (204) may include an inactive state and may include an active state for the page (205). In one more embodiment, the validity information of the pages (204) and (205) may include an active state or may include an inactive state.

When, the page (204) is replicated in the non-volatile buffer (202), at step (306) the page (204) is updated with the transaction contents. The index (206) of the page (204) is maintained in the non-volatile memory (106) before updating the page (204) in order to keep track of updating happened to the page (204). Specifically, one or more of the previously written transaction contents may be updated with the transaction contents (C1, C2, and C3). For updating, the original transaction contents of the page (204) are copied to a read-write buffer (not shown in figures) and thereafter the transaction contents of the page (204) are erased. The copied transaction contents are modified in the read-write buffer in accordance with the transaction requirements. The modified contents are written the page (204), thereby updating the page (204) with the transaction contents (C1, C2, and C3).

During implementation of the defined transaction, any number of times the transactions contents (C1, C2, and C3) may be replaced with updated version of the transaction contents (C1, C2, and C3). Therefore, the present invention replicates the page (204) only once in the non-volatile buffer (202) during implementation of the defined transaction, and further updates the transaction contents (C1, C2, and C3) on the page (204) multiple times until the implementation of the defined transaction is going on. Therefore, the present invention reduces the need of backing up the page (204) multiple times in the non-volatile buffer (202) thereby reducing the consumption of memory area of the non-volatile memory (106), whereas prior arts perform back up of the page (204) and contents (C1, C2, and C3) of the page (204) every time even if any one of the transaction contents (C1, C2, and C3) is updated which leads to unnecessary execution burden on the conventional devices of the prior art. Furthermore, due to reduced number of page backups in the present invention, execution time of implementing the defined transaction increases, thereby providing speedy operation of the transactions in the non-volatile memory.

At the step (308), it is determined whether the page (204) is updated without interruption, wherein the interruption may be caused by disruption of power supply to the handheld device (102) or may be based on aborting of the defined transaction by a user of the handheld device (102). In an event, the transaction contents (C1, C2, and C3) are updated and the updation of the pages have not been interrupted, then at step 314, it is determined whether the transaction is committed. In an event, it is determined that the defined transaction is not committed at the step (314), again the steps 302 to 308 are performed. In an event, at step 314 it is determined that the defined transaction is committed, then the replicated page stored in the non-volatile buffer (202) is discarded.

In an event, an interruption is caused during implementation of the defined transaction, then at step (310) the defined transaction is rolled back to the original state. When the defined transaction is rolled back, based on the index (206) of the page (204) which was maintained in the non-volatile memory (106), it is determined whether the defined transaction was started. In rolling back of the defined transaction, the replicated page which is stored in the non-volatile buffer is restored at the location of the page (204) determined based on the index (206) of the page (204) which was maintained in the non-volatile memory (106). In an exemplary embodiment, page (205) was also backed up along with the page (204), then during rolling back of the defined transaction, the page (205) and (204) for which the validity information in the index (206) represent the active state, that page is restored. The pages (205) and (204) for which the validity information in the index (206) represents the inactive state, that page is discarded.

Due to reduced number of page backup in the non-volatile buffer (202), consumption of memory area in the buffer is less conventional techniques because if backup update request comes for same page during same transaction cycle, it is not required to take back up again. Further, the present invention facilitates execution speed which is faster than conventional methods by 25-30%. Furthermore, in accordance with an embodiment of the present invention, the method and system of the present invention facilitates the page anti-tearing for non-atomic transactions.

Table 1 illustrates comparison of the method of the present invention and a conventional method, implemented in an electronic device at the time of performing operations on the electronic device.

TABLE 1

|  | Installation Operation | | | Deletion Operation | | |
| --- | --- | --- | --- | --- | --- | --- |
|  | Conventional technique | Present Invention | Improvement | Conventional technique | Present Invention | Improvement |
| Performance | 2.12 seconds | 1.54 seconds | 27.35% | 1.24 seconds | 0.96 seconds | 22.58% |
| No of Erase request | 448 | 343 | 23.43% | 200 | 166 | 17% |
| No of Write request | 1311 | 669 | 48.97% | 664 | 355 | 46.53% |

Furthermore, the present invention was described in part above with reference to flowchart illustrations and/or block diagrams of methods, and apparatus (systems) according to embodiments of the invention.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus like a scanner/check scanner to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and schematic diagrams illustrate the architecture, functionality, and operations of some embodiments of methods, systems, and computer program products for managing security associations over a communication network. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

The various embodiments described above can be combined to provide further embodiments. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of recording a transaction requiring one or more updates in a page-oriented non-volatile memory, comprising the following steps for each said update:
   identifying one or more pages that need to be modified for implementing the update, each of the identified one or more pages having a corresponding index;
   determining whether one or more of the identified one or more pages are replicated in one or more non-volatile buffers;
   replicating only ones of the identified one or more pages that are not already replicated in the one or more non-volatile buffers;
   modifying contents of each one of the identified one or more pages in accordance with the update, wherein said modifying comprises copying original contents of each of the one or more identified pages to a read-write buffer, erasing each of the one or more identified pages, modifying the contents of each of the one or more identified pages in the read-write buffer in accordance with transaction update parameters, and writing to each of the one or more identified pages the modified contents thereof; and
   once the transaction has completed, discarding the replicated pages in the one or more non-volatile buffers or, if the transaction terminates without completing, restoring the contents of the identified one or more pages from the contents of the replicated pages in the one or more non-volatile buffers.

2. The method as claimed in claim 1, wherein said step of determining is implemented by searching the identified one or more pages with the corresponding index of each of the one or more identified pages in the one or more non-volatile buffers.

3. The method as claimed in claim 1, wherein said step of replicating comprises copying the contents of each of the one or more identified pages and its index in the one or more non-volatile buffers and storing a validity information of each identified page as valid.

4. The method as claimed in claim 1, wherein said index comprises an address of said one or more identified pages, and validity information representing a state of an operation being performed on said one or more identified pages.

5. The method as claimed in claim 1, wherein said step of discarding comprises erasing all invalid page replicates with invalid validity information.

6. The method as claimed in claim 1, wherein said step of restoring is implemented on the basis of validity information representing an active state of an operation in progress on said one or more identified pages.

7. The method as claimed in claim 1, wherein, in the event of an interruption caused by tearing, the transaction is rolled back at a next power-up by restoring each of the one or more identified pages that have validity information of valid.

8. A device for recording a transaction comprising one or more updates in a page-oriented non-volatile memory, comprising one or more processing units configured to:
   identify one or more pages that need to be modified for implementing the update, each of the identified one or more pages having a corresponding index;
   determine whether one or more of the identified one or more pages are replicated in one or more non-volatile buffers;
   replicate only ones of the identified one or more pages that are not already replicated in the one or more non-volatile buffers;
   modify contents of each one of the identified one or more pages in accordance with the update, wherein said modifying comprises copying original contents of each of the one or more identified pages to a read-write buffer, erasing each of the one or more identified pages, modifying the contents of each of the one or more identified pages in the read-write buffer in accordance with transaction update parameters, and writing to each of the one or more identified pages the modified contents thereof; and
   once the transaction has completed, discard the replicated pages in the one or more non-volatile buffers or, if the transaction terminates without completing, restoring the contents of the identified one or more pages from the contents of the replicated pages in the one or more non-volatile buffers.

9. The device as claimed in claim 8, wherein the determination of whether one or more of the identified one or more pages are replicated is implemented by searching the identified one or more pages with the corresponding index of each of the one or more identified pages in the one or more non-volatile buffers.

10. The device as claimed in claim 8, wherein said replication of the only ones of the identified one or more pages that are not already replicated in the one or more non-volatile buffers comprises copying the contents of each of the one or more identified pages and its index in the one or more non-volatile buffers and storing a validity information of each identified page as valid.

11. The device as claimed in claim 8, wherein said index comprises an address of said one or more identified pages, and validity information representing a state of an operation being performed on said one or more identified pages.

12. The device as claimed in claim 8, wherein said discarding of the replicated pages in the one or more non-volatile buffers comprises erasing all invalid page replicates with invalid validity information.

13. The device according to claim 8, wherein said restoring of the contents of the identified one or more pages is implemented on the basis of validity information representing an active state of an operation in progress on said one or more identified pages.

14. The device as claimed in claim 8, wherein, in the event of an interruption caused by tearing, the transaction is rolled back at a next power-up by restoring each of the one or more identified pages that have validity information of valid.

15. The device as claimed in claim 8, wherein the page oriented non-volatile memory is a flash memory.

\* \* \* \* \*